No. 627,118. Patented June 20, 1899.
L. A. HILL.
BICYCLE WHEEL.
(Application filed Aug. 15, 1898.)
(No Model.)
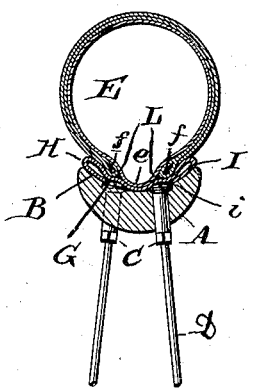
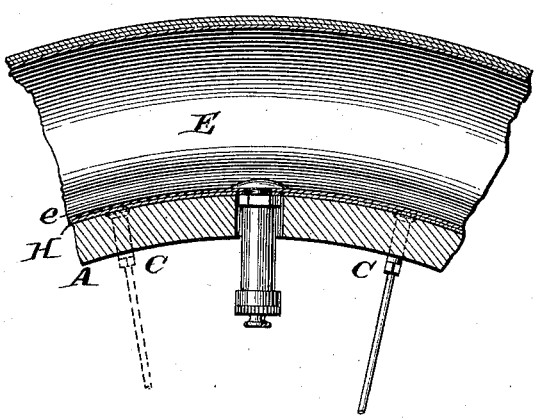
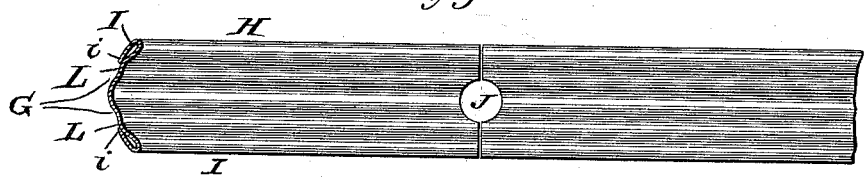
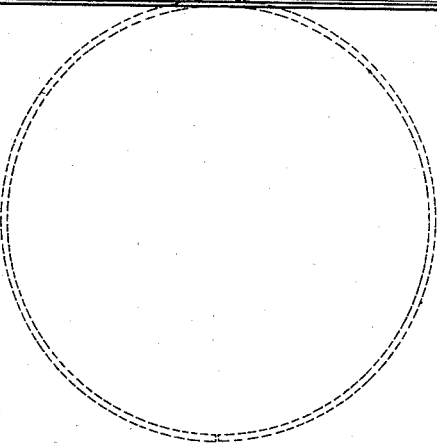
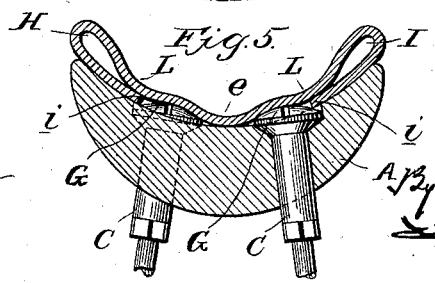
Witnesses
E. C. Wurdeman
R. M. Kelly
Inventor
Louis A. Hill
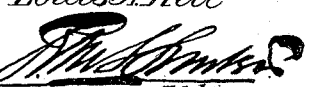
Attorney
THE NORRIS PETERS CO., PHOTO-LITHO., WASHINGTON, D. C.

UNITED STATES PATENT OFFICE.

LOUIS A. HILL, OF PHILADELPHIA, PENNSYLVANIA.

BICYCLE-WHEEL.

SPECIFICATION forming part of Letters Patent No. 627,118, dated June 20, 1899.

Application filed August 15, 1898. Serial No. 688,560. (No model.)

*To all whom it may concern:*

Be it known that I, LOUIS A. HILL, of the city and county of Philadelphia and State of Pennsylvania, have invented an Improvement in Bicycle-Wheels, of which the following is a specification.

My invention has reference to bicycle-wheels; and it consists of certain improvements which are fully set forth in the following specification and shown in the accompanying drawings, which form a part thereof.

My improvements comprehend certain features of construction especially adapted for use in connection with a clencher or a double-tube tire—such, for example, as the "Dunlop." Heretofore it has been customary to form the wooden rims with circumferential grooves upon the outer surface of such shape as would receive the retaining-wires and rubber portions or clenching structure of the outer shoe or wearing-tube and so that when the inner tube is inflated the tire expands and adjusts itself upon the annular grooves, so as to make it perfectly firm upon the wooden rim. However, considerable difficulty has arisen from the fact that the spoke-heads, which extend through the rim, present rough or sharp edges, between or upon which the soft inner tube is pressed on inflation and injured, so that in time it is caused to leak whenever the covering of fabric which is intended to cover the said spoke-heads and protect the tube becomes displaced. This defect frequently happens and is a cause of great annoyance, especially because it is invariably unlooked for. This defect is wholly overcome by my improvements, which are set out hereinafter in detail.

Another feature which is well known to all bicycle manufacturers and which causes considerable annoyance to them is that the standard wheel-rims in this country are made with smooth outer grooves, adapted for use in connection with a solid-tube smooth tire, and cannot be used with a double-tube or clencher tire—such, for example, as the Dunlop. It requires, therefore, when an order necessitates the placing of double-tube tires on the bicycle to prepare special rims adapted to receive the double-tube tire. This change from the standard constructions necessitates great loss of time, and hence it greatly increases the expense.

The object of my invention is to provide a suitable means whereby any ordinary wheel-rim adapted to a single-tube tire may be quickly and inexpensively changed to adapt it to receive a Dunlop or other double-tube or clencher tire and at the same time present a more satisfactory protection against the distraction of the inner tube by the spoke-heads, and yet at the same time to enable the wheel-rim to be adapted for use in connection with a solid-tube tire at a moment's notice, if so desired.

In carrying out my invention I provide the ordinary "Crescent" or other type of wooden wheel-rim having a smooth groove in the periphery with an outer metallic band which is curved in cross-section, so as to present the necessary longitudinal circumferential grooves, such as required to receive the double-tube tire, and which band at the same time is adapted to snugly rest in the ordinary groove of the rim and properly protect and shield the inner tube against contact with the spoke-heads. Furthermore, the outer edges of the metallic band are preferably turned in and under, so as to form lateral shoulders which rest against the spoke-heads and prevent lateral displacement or shifting of said band upon the wheel-rim. This band of the proper cross-section is loosely bent around into a circle and is adapted to have its ends abut, and said ends are notched to fit around the pneumatic valve of the tire where it passes through the rim. When the tire is inflated, the pressure produced by the expanding tube causes the rubber to press upon the band and hold it firmly in position upon the wheel-rim, thus obviating the necessity of any permanent attaching devices.

My invention will be better understood by reference to the accompanying drawings, in which—

Figure 1 is a cross-section of a bicycle wheel-rim and tire embodying my improvements. Fig. 2 is a perspective view of a portion of the rim-band embodying my improvements. Fig. 3 is a longitudinal section through the rim, tube, and band of the wheel. Fig. 4 illustrates the formation and subsequent circular shape of my improved rim-band, and Fig. 5 is an enlarged cross-section of the wheel rim and band.

A is the ordinary wooden rim of a bicycle-wheel and has its outer surface B made grooved in a transverse direction, and this groove continues around the wheel-rim to form an annular circumferential groove.

D are the spokes, and C are the spoke-heads, which fit through the rim A and receive the ends of the spokes. The inner ends of these spoke-heads are enlarged, so as to hold upon the wood rim and thereby enable the tightening of the spokes.

E is the ordinary inner tube of a Dunlop tire, and F is the ordinary outer tube thereof. The portion of the outer tube or shoe which comes adjacent to the wheel-rim is provided with the retaining annular wires $f$, embedded in the edges of the rubber outer case or shoe. The inner tube is free to expand between the said wires $f$. In the rims commonly in use the outer shoe surrounding the wires $f$ was received in grooves, and the parts $e$ of the inner tube were likewise received in a lower central groove.

In my improved construction I interpose between the wooden rim A and pneumatic tire a metallic band H, preferably formed of aluminium on account of lightness. This band is made of substantially the shape illustrated in Fig. 1 in cross-section and bent into a ring, which when placed around the rim abuts, or approximately so, as indicated at K in Fig. 2. The abutting ends are notched at the center to form an aperture J, which receives the valve of the pneumatic tube. It will be observed that the central part of the band is depressed between the two rows of spoke-heads C to form a base or seat for the portion $e$ of the inner tube. This leaves the raised portions G G, which extend from the central portion over the spoke-heads C, to thoroughly protect the tire from contact with them. The lateral edges of the band are lapped or bent over into beads, as at I, and the edges are bent under, so as to approximately reach the spoke-heads, as clearly shown in Fig. 1. In this manner the band is held in position and cannot shift laterally on account of contact of the said edges $i$ with said spoke-heads. The beaded portions I extend upward to a little above the upper edges of the wooden rim, so as to slightly increase the height at these points and also to form thereby the depressions L, which directly receive the wires $f$ and the surrounding rubber of the outer tube or shoe. In practice this metal band may be very light and is quickly placed in position and held there by the inflation of the tire. This construction obviates the necessity of cementing canvas over the spoke-heads and presents an upper surface which is absolutely smooth and devoid of all dangerous projections which might destroy the light inner tube.

In some special cases the clencher-tires are made without inner tubes and when in use constitute single-tube tires, and it is to be understood that my invention is equally applicable to this class of clencher-tires as well as the particular type known as the "double-tube tire." It is to be understood that the mere shape in cross-section of the band may be changed or varied to suit the particular configuration necessary to conform to the various types of double-tube or clencher tires, as will be self-apparent to any one skilled in the art. I therefore do not confine myself to the identical shape of the band itself here illustrated.

Having now described my invention, what I claim as new, and desire to secure by Letters Patent, is—

1. In a bicycle-wheel, the combination of a grooved rim, with a double-tube or clencher tire, and an intermediate detachable metallic band having its lateral sides bent under and extended inward sufficiently to sustain the band upon the rim and the central portion of the band bent inward into a longitudinal groove $e$ also resting upon the rim intermediate of the lateral portions and adapted to properly receive the adjacent parts of the rubber tire on the outer side.

2. In a bicycle-wheel, the combination of a grooved rim, with a double-tube or clencher tire, and an intermediate detachable transversely-divided metallic band formed of one piece having a conformation on the inner side adapted to fit into the groove of the rim and a different conformation on the upper or outer side to properly receive the adjacent parts of the rubber tire, the said band being loosely placed about the rim and provided with an aperture through which the valve of the pneumatic tube may pass and adapted to be held in place by the inflation of the pneumatic tube.

3. In a bicycle-wheel, the combination of a grooved rim having the outer surface made with a continuous single curve in cross-section, with a double-tube or clencher tire, and an intermediate detachable metallic band having a conformation on the inner side adapted to fit into the groove of the rim and a different conformation on the upper or outer side to properly receive the adjacent parts of the rubber tire, the lateral edges of said interposed band being bent or beaded and extended under and resting in the groove of the rim.

4. In a bicycle-wheel, the combination of a rim having a plain groove as shown, with a double or clencher tire, and an intermediate detachable metallic band formed of a single strip having its outer surface made continuous laterally and formed with three grooves $e$, L L and having the lateral edges bent under to conform to the curve of the rim and sustain the outer parts forming the grooves L L clear of the wooden rim said band being adapted to properly receive the adjacent parts of the rubber tire on the outer side.

5. In a bicycle-wheel, the combination of a grooved rim, with a double-tube or clencher tire, and an intermediate detachable metallic band formed of a single strip of metal having a conformation adapted to fit into the groove of the rim and to properly receive the adjacent parts of the rubber tire on the outer side, and in which the interposed band is formed with annular recesses G, G, on its side adjacent to the rim to receive the spoke-heads, and annular grooves L, L, upon its outer side to receive the corresponding portions of the outer tube or shoe of the pneumatic tire.

6. In a bicycle-wheel, the combination of a grooved-rim, with a double-tube or clencher tire, and an intermediate detachable metallic band having a conformation adapted to fit into the groove of the rim and to properly receive the adjacent parts of the rubber tire on the outer side, and in which the interposed band is formed with annular recesses G, G, on its side adjacent to the rim to receive the spoke-heads, and annular grooves L, L, upon its outer side to receive the corresponding portions of the outer tube or shoe of the pneumatic tire, and further having the outer lateral edges turned over or beaded and the parts so shaped as to form shoulders between which to confine the spoke-heads.

7. As a new article of manufacture, a detachable band for a bicycle-wheel adapted to encircle an ordinary grooved rim and having its inner surface formed on a configuration adapted to seat itself upon an ordinary groove suitable for a single-tube tire and having its outer surface grooved to receive the inner parts of a double-tube or a clencher tire whereby with the application of said band a single-tube-tire wheel can be quickly converted into a double-tube or clencher tire wheel, and in which the said band is divided and its abutting ends notched to form an aperture through which the air-valve of the pneumatic tube may pass.

8. As a new article of manufacture, an intermediate band for insertion between the wooden rim and a double-tube or clencher pneumatic tire having beaded sides I with the adjacent outer annular grooves L, L, and the inner annular grooves or recesses G, G, and further having the lateral edges turned under as at $i, i$ to form shoulders or abutments.

In testimony of which invention I hereunto set my hand.

LOUIS A. HILL.

Witnesses:
R. M. HUNTER,
R. M. KELLY.